US010780985B2

(12) United States Patent
Kohlmeier-Beckmann et al.

(10) Patent No.: US 10,780,985 B2
(45) Date of Patent: Sep. 22, 2020

(54) EVACUATION SLIDE COMPRISING A LIGHTING SYSTEM

(71) Applicant: Airbus Operations GmbH, Hamburg (DE)

(72) Inventors: Carsten Kohlmeier-Beckmann, Hamburg (DE); Fred Raszpir, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/962,799

(22) Filed: Dec. 8, 2015

(65) Prior Publication Data
US 2016/0167795 A1 Jun. 16, 2016

(30) Foreign Application Priority Data
Dec. 10, 2014 (EP) .................................... 14197182

(51) Int. Cl.
*B64D 25/14* (2006.01)
*A62B 1/20* (2006.01)
(52) U.S. Cl.
CPC ................ *B64D 25/14* (2013.01); *A62B 1/20* (2013.01)
(58) Field of Classification Search
CPC .................................. B64D 25/14; A62B 1/20
See application file for complete search history.

(56) References Cited

U.S. PATENT DOCUMENTS 3,621,383 A * 11/1971 Rush .................. B64D 25/14
324/414
5,444,604 A * 8/1995 Hiner ...................... B60Q 7/02
362/310
6,966,414 B2 11/2005 Zonneveld
7,018,079 B1 * 3/2006 Franco-Vila ............ A62B 1/20
362/470
2005/0115794 A1 * 6/2005 Zonneveld ............... A62B 3/00
193/5
2007/0284188 A1 * 12/2007 Chippindale ............ A62B 1/20
182/48
2010/0258677 A1 * 10/2010 O'Donnell ............. B64D 25/14
244/137.2

(Continued)

FOREIGN PATENT DOCUMENTS

| DE | 100 43 251 A1 | 4/2002 | |
|----|---|---|---|
| DE | 10 2010 055 704 A1 | 6/2012 | |
| DE | 102010055704 A1 * | 6/2012 | ............. B64D 25/14 |

(Continued)

OTHER PUBLICATIONS

European Search Report for Application No. 14 197 182.0 dated May 20, 2015.

*Primary Examiner* — Katherine W Mitchell
*Assistant Examiner* — Candace L Bradford
(74) *Attorney, Agent, or Firm* — Jenkins, Wilson, Taylor & Hunt, P.A.

(57) ABSTRACT

An evacuation slide including a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated. A light signal generating device is adapted to generate a light signal which illuminates the bottom end portion of the sliding face.

12 Claims, 2 Drawing Sheets

(56) References Cited

U.S. PATENT DOCUMENTS

| | | | | |
|---|---|---|---|---|
| 2013/0213737 A1* | 8/2013 | Bambrick | ................ | A62B 1/20 |
| | | | | 182/18 |
| 2014/0202791 A1* | 7/2014 | Aldosari | ................ | A62B 1/20 |
| | | | | 182/18 |

FOREIGN PATENT DOCUMENTS

| | | | | |
|---|---|---|---|---|
| DE | 102010055704 A1 * | 6/2012 | ............ | B64D 25/14 |
| EP | 0034358 A2 * | 8/1981 | ............ | B64D 25/14 |
| EP | 1410987 A2 * | 4/2004 | ............ | B64D 25/14 |
| EP | 1431178 A1 * | 6/2004 | ............ | B64D 25/14 |
| EP | 1431178 A1 * | 6/2004 | ............ | B64D 25/14 |
| GB | 2382301 A * | 5/2003 | ............... | A62B 1/20 |
| GB | 2382301 A * | 5/2003 | ............... | A62B 1/20 |
| WO | WO 2012/084184 A1 | 6/2012 | | |

\* cited by examiner

EVACUATION SLIDE COMPRISING A LIGHTING SYSTEM

CROSS-REFERENCE TO RELATED APPLICATION

This application claims priority to EP 14 197 182.0 filed Dec. 10, 2014, the entire disclosure of which is incorporated by reference herein.

TECHNICAL FIELD

The present disclosure relates to an evacuation slide provided with a lighting system. Further, the disclosure herein relates to a vehicle, in particular an aircraft equipped with an evacuation slide of this kind.

BACKGROUND

Current passenger aircraft are equipped with inflatable evacuation slides which allow evacuating passengers and crew members from an aircraft cabin after an emergency landing of the aircraft. Typically, an inflatable evacuation slide is associated with a door or an emergency exit of the aircraft cabin such that persons leaving the aircraft cabin through the door or emergency exit can step on or jump on the evacuation slide and slide down the evacuation slide to the ground. Hence, the evacuation slides ensure that passengers and crew members can leave the aircraft cabin even in case the aircraft is of a size which does not allow a direct escape from the cabin to the ground.

Typically, an evacuation of all passengers on board the aircraft within 90 seconds has to be guaranteed with 50% of the doors available for evacuation. The maximum passenger number for a cabin equipped with, for example, four (4) Type A exit pairs is limited to 440 passengers. An increase of the passenger number thus requires equipping the aircraft cabin with an additional door or door pair which, however, might be undesirable because of the technical outlay, the costs and the weight. On the other hand, experience has shown that currently used evacuation slides are in principle capable of dealing flow rates more than 110 persons Type A exit rating. However, experience from tests indicates that many evacuees are reluctant to move as quickly as they could due to missing guidance and features providing clear view about the descent, in particular in dark-of-night conditions.

DE 10 2010 055 704 A1 and WO 2012/084184 A1 therefore propose to equip a system for evacuating persons from a vehicle with a light signal generating device, which is adapted to emit at least one visual light signal that indicates at least one preset escape route for at least one person that is to be evacuated. The light signal generating device generates a visual light signal that may be discerned by a person and that informs and/or instructs the person, in which direction or at which location the person may reach safety in a hazardous situation. For example, the light signal generating device may be adapted to emit a light signal in the region of a dividing device, which divides an evacuation slide into a first slideway and a second slideway and extends substantially over the length of the evacuation slide. Alternatively or additionally, the light signal generating device may be adapted to display a light signal in a region of a top end of the evacuation slide which indicates a first position that is adjusted to a preset first entry point of the evacuation slide or in a region extending from the bottom end of the evacuation slide in a direction leading away from the evacuation slide.

SUMMARY

The disclosure herein is directed at an object to provide an evacuation slide having a lighting system which allows improving guidance and orientation of persons being evacuated with the aid of the evacuation slide. Further, the disclosure herein is directed to an object to provide a vehicle, in particular an aircraft, which is equipped with an evacuation slide of this kind.

An evacuation slide according to the disclosure herein comprises a sliding face having a top end portion adapted to be positioned adjacent to an exit of a region to be evacuated. The exit may be an emergency exit or a regular door of the region to be evacuated. The region to be evacuated may be a building or a part of a building, but may also be a vehicle such as, for example, a ship, a train or an aircraft, or a part of a vehicle. The top end portion of the sliding face may be adapted to be positioned directly, that is to say immediately, adjacent to the exit of the region to be evacuated. It is, however, also conceivable to design the top end portion of the sliding face in such a way that the top end portion of the sliding face is connectable to the exit of the region to be evacuated via a suitable transition element.

The sliding face further comprises a bottom end portion adapted to be positioned adjacent to an escape route leading away from the region to be evacuated and being arranged at a lower height than the region to be evacuated. The escape route may be a predefined route which may be marked so as to direct an evacuee, but may also be any arbitrary route which is not further defined, as long as it leads away from the region to be evacuated. For example, the escape route may be a predefined or not further defined route on the ground which leads away from the region to be evacuated which in turn is arranged at a certain elevation above the ground. The sliding face of the evacuation slide thus defines an inclined slide path connecting the region to be evacuated to the escape route arranged at a lower elevation level. The evacuation slide thus is particularly suitable for use in a vehicle such as, for example, an aircraft for evacuating persons from a cabin positioned above the ground, since the evacuation slide allows persons leaving the vehicle cabin to quickly slide down to an escape route on the ground. After reaching the ground, the evacuees may move further away from the vehicle to be evacuated by following the escape route on the ground.

The evacuation slide further comprises a light signal generating device adapted to generate a light signal which illuminates the bottom end portion of the sliding face. The light signal produced by the light generating device provides a clear indication for an evacuee where the evacuee must change his or her posture to leave the sliding face of the evacuation slide and to continue his or her way along the escape route and is already visible for the evacuee when the evacuee steps on the sliding face of the evacuation slide at the top end portion thereof. As a result, the confidence of evacuees about to leave the sliding face of the evacuation slide and to continue their way along the escape route is increased. Thus, hesitation can be avoided and the evacuation flow rate in the area of the top end portion of the sliding face can be increased.

In addition, the light signal produced by the light signal generating device increases the visible contrast between the usually greyish sliding face and the usually also greyish escape route leading away from the region to be evacuated, for example on the ground, as well as the overall brightness in the region of the bottom end portion of the sliding face. As a consequence, an evacuee sliding down the sliding face of the evacuation slide is able to prepare for active movement when reaching the bottom end portion of the sliding face which leads to a reduced risk of injuries, for example sprain or luxation, due to wrong movement when reaching the bottom end portion of the sliding face and touching the escape route extending for example on the ground unprepared. The illumination of the bottom end portion of the sliding face thus also allows avoiding disturbance of the evacuee flow rate at the bottom end of the evacuation slide at the transition to the escape route. In summary, the evacuation slide allows improving guidance and orientation of persons being evacuated with the aid of the evacuation slide and hence helps not only to increase the evacuee flow rate from the region to be evacuated but also to reduce the risk of injuries to the evacuees, in particular in dark-of-night conditions.

The evacuation slide may be inflatable. In a non-inflated state, the evacuation slide may be folded up compactly and stowed in the region to be evacuated in case of emergency. The evacuation slide may comprise an inflation device with an activating mechanism, an independent energy supply and/or gas cartridges, which is adapted to inflate the evacuation slide upon actuation of a switch. The switch may be disposed in the region of the exit of the region to be evacuated and may be designed so as to be manually operable. The switch may, however, also be designed so as to be automatically actuatable, for example upon opening a door closing the exit of the region to be evacuated.

In a preferred embodiment of the evacuation slide, the light signal generating device is adapted to generate a light signal which is limited to the bottom end portion of the sliding face. In other words, the light signal generating device preferably is adapted to generate a light signal which illuminates the bottom end portion of the sliding face, but which does not illuminate the escape route extending from the bottom end portion of the sliding face. As a result, the light signal produced by the light signal generating device provides a clear indication for an evacuee where the sliding face of the evacuation slide ends and where the escape route begins.

In particular, the light signal generating device may be adapted to generate a light signal having an irradiation direction which extends substantially perpendicular to a moving direction of the evacuee on the sliding face of the evacuation slide. The visible brightness contrast between the bottom end portion of the sliding face and the escape route thus is further improved.

The light signal generating device may comprise a first lighting element. Alternatively or additionally thereto, the light signal generating device may comprise a second lighting element. A light signal generating device which is equipped with two lighting elements provides for at least some redundancy in case of failure of one of the lighting elements. The light signal generating device may further comprise an energy source, for example in the form of a battery, an accumulator, or the like which provides the lighting element(s) with electric energy. Moreover, the light signal generating device may comprise a control unit which may be adapted to control the supply of energy to the lighting element(s) and/or which may be adapted to control the operation of the lighting element(s). For example, the control unit may be adapted to control the lighting element(s) in such a manner that the lighting element(s) emit(s) a continuous light signal or a light signal with changing intensity or color over time.

At least one of the first lighting element and the second lighting element may comprise a light emitting diode, in particular a white light emitting diode. A light emitting diode features low energy consumption and a compact design while still providing the desired light quantity and luminance which is necessary to illuminate the bottom end portion of the sliding face as desired. It is, however, also conceivable to equip the light signal generating device with a first lighting element and/or a second lighting element comprising another active light source, for example in the form of a bulb, a laser or a chemically, thermally or otherwise activatable luminescent substance, or a passive light source, for example a reflector.

At least one of the first lighting element and the second lighting element may comprise a focusing lens adapted to focus the light emitted by the at least one of the first lighting element and the second lighting element to the bottom end portion of the sliding face. Equipping at least one of the first lighting element and the second lighting element with a focusing lens allows to ensure that the light signal emitted by the at least one of the first lighting element and the second lighting element is limited to a desired area of the bottom end portion of the sliding face, whereas the escape route is not illuminated.

In a preferred embodiment of the evacuation slide, the first lighting element is arranged in a first lateral edge portion of the evacuation slide and is adapted to irradiate light in an irradiation direction directed towards a center portion of the sliding face. The first lighting element then is particularly suitable to produce a light signal having an irradiation direction extending substantially perpendicular to the moving direction of an evacuee on the sliding face of the evacuation slide while being arranged at a position outside of the slide path of the evacuee on the sliding face.

Alternatively or additionally, the second lighting element may be arranged in a second lateral edge portion of the evacuation slide opposite the first lateral edge portion and may be adapted to irradiate light in an irradiation direction directed towards a center portion of the sliding face. The second lighting element then is also particularly suitable to produce a light signal having an irradiation direction extending substantially perpendicular to the moving direction of an evacuee on the sliding face of the evacuation slide while being arranged at a position outside of the slide path of the evacuee on the sliding face. A light signal generating device having a first lighting element arranged in a first lateral edge region of the evacuation slide and a second lighting element arranged in a second lateral edge region of the evacuation slide opposite to the first lighting element is particularly suitable for illuminating the bottom end portion of a sliding face which is divided into two independent slideways which may be separated from each other, for example, by a dividing element extending along the sliding face in the center portion thereof.

At least one of the first lighting element and the second lighting element may be fixed to a lateral limitation element extending from the sliding face along a lateral edge thereof. The lateral limitation element may serve to prevent evacuees from falling off the evacuation slide while sliding down the sliding face and hence preferably extends from the sliding face to a certain height. Using a lateral limitation element for attaching at least one of the first lighting element and the second lighting element allows dispensing with an additional arrangement for positioning and fixing the lighting element(s).

Preferably, at least one of the first lighting element and the second lighting element is fixed to a wall portion of the lateral limitation element which faces the center portion of the sliding face. The lighting element(s) then is/are arranged in an optimum position for irradiating light in an irradiation direction directed in a direction perpendicular to the moving direction of an evacuee on the sliding face and in a direction towards a center portion of the sliding face from slightly above the sliding face.

As an alternative, it is, however, also conceivable that at least one of the first lighting element and the second lighting element is fixed to the sliding face in the region of a lateral edge thereof. This arrangement of the at least one of the first lighting element and the second lighting element is advantageous in case the lateral limitation elements do not extend to the bottom end of the sliding face.

A vehicle according to the disclosure herein comprises an evacuation slide as described above.

Preferably, the vehicle is a passenger vehicle, in particular an aircraft.

BRIEF DESCRIPTION OF THE DRAWINGS

A preferred embodiment of the disclosure herein is now described in greater detail with reference to the appended schematic drawings wherein.

DETAILED DESCRIPTION

Figure 1:
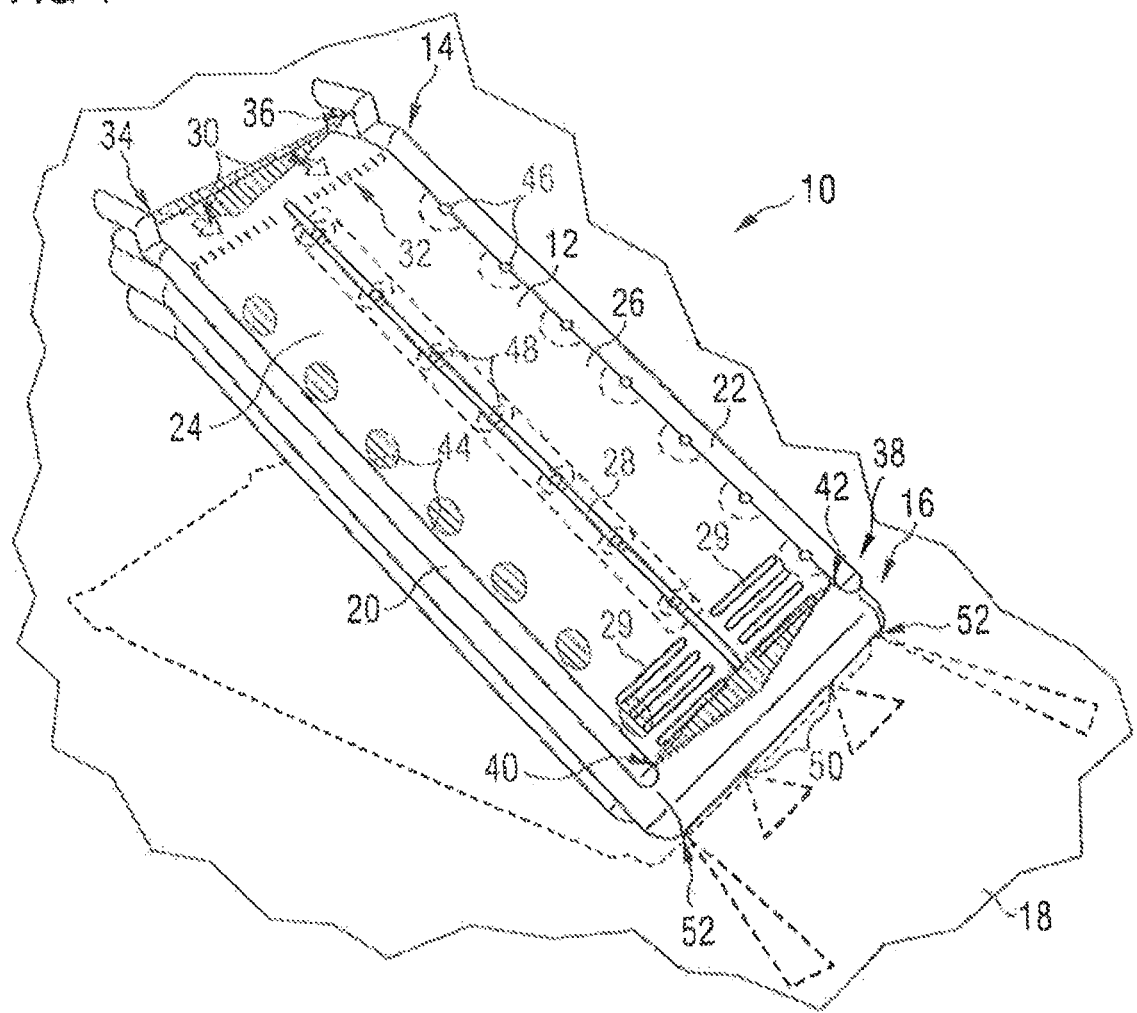
FIG. 1 shows a three dimensional view of an evacuation slide.

FIG. 1 shows an evacuation slide 10 designed in the form of an inflatable device which, when not in use, is stowed as a compact package close to an exit of a region to be evacuated. The evacuation slide 10 comprises a sliding face 12 having a top end portion 14 which is adapted to be positioned adjacent to the exit of the region to be evacuated, and a bottom end portion 16 adapted to be positioned adjacent an escape route 18 leading away from the region to be evacuated and being arranged at a lower height than the region to be evacuated. The sliding face 12 thus defines an inclined slide path connecting the region to be evacuated to the escape route 18 which, relative to the region to be evacuated, is arranged at a lower elevation level.

The evacuation slide 10 is in particular suitable for use in an aircraft to evacuate passengers and crew members from an aircraft cabin in case of an emergency. Thus, when inflated, as shown in the figures for example, the evacuation slide 10 extends from a door or an emergency exit of the aircraft cabin downwards in the direction of the ground. The escape route 18 extends on the ground and leads away from the aircraft to be evacuated.

In a first lateral edge portion, the evacuation slide 10 is provided with a first lateral limitation element 20. The first lateral limitation element 20 extends upwards from the sliding face 12 and serves to prevent persons sliding down the sliding face 12 of the evacuation slide 10 from falling off the evacuation slide 10. Similarly, a second lateral limitation element 22 is arranged in a second lateral edge portion of the evacuation slide 10 which also extends upwards from the sliding face 12 and also serves to prevent persons sliding down the sliding face 12 of the evacuation slide from falling off the evacuation slide 10. The sliding face 12 of the evacuation slide 10 is divided into two separate slideways 24, 26 which are separated from each other by a dividing element 28 extending in a center region of the sliding face 12 upwards from the sliding face 12. In the bottom end portion 16 of the sliding face 12, decelerations panels 29 are provided for each slideway 24, 26 which have a coarse surface and which serve to decelerate the sliding movement of an evacuee sliding down the evacuation slide 10 before reaching the bottom end of the evacuation slide 10.

In the region of its top end portion 14, the sliding face 12 comprises markings in the form of arrows 30 and in the form of a scratch line 32, the scratch line 32 extending across the sliding face 12 from the first lateral limitation element 20 to the second lateral limitation element 22 and substantially perpendicular to the dividing element 28. The arrows 30 are arranged in an area of the top end portion 14 of the sliding face 12 which is still flat, that is to say not inclined. By the arrows 30, evacuees are directed into the two parallel slideways 24, 26 defined on the sliding face 12. The scratch line 32 is arranged in an area of the top end portion 14 of the sliding face 12 where the inclination of the sliding face 12 changes and hence provides a clear indication for the evacuees where the inclined, that is to say steep portion of the sliding face 12 begins. Both the arrows 30 and the scratch line 32 are made of a fluorescent material which emits fluorescence when being irradiated with UV-light from UV-light sources 34, 36. The UV-light sources 34, 36 are fixed to a wall portion of the first and the second lateral limitation element 20, 22, respectively, which faces the dividing element 28. When being irradiated with UV-light from UV-light sources 34, 36, the arrows 30 and the scratch line 32 are clearly visible also in dark-of-night conditions.

Figure 2:
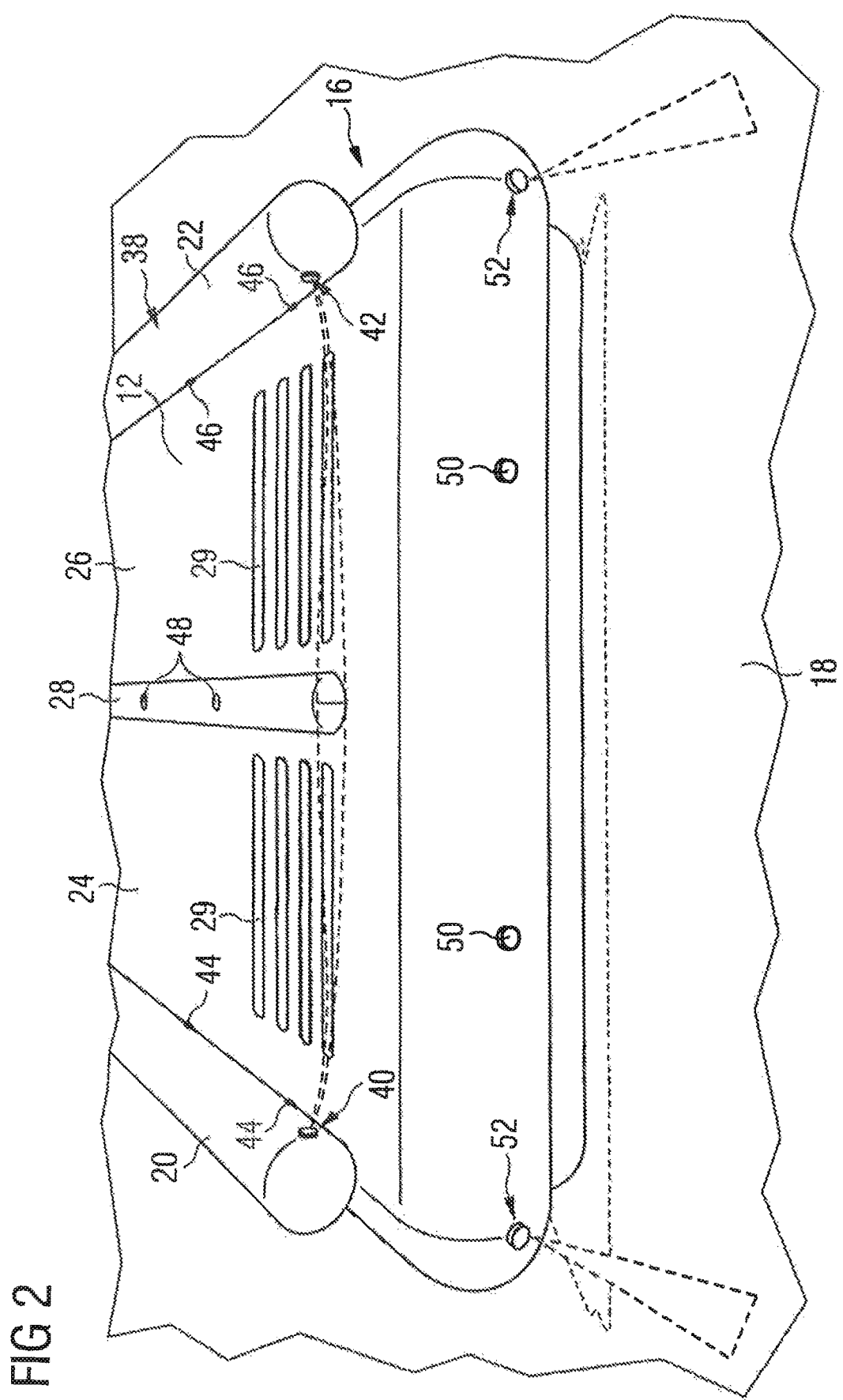
FIG. 2 shows a detailed three dimensional view of a bottom end portion of the evacuation slide according to FIG. 1.

The evacuation slide 10 further is equipped with a light signal generating device 38 which is adapted to generate light signals for illuminating various parts of the evacuation slide 10. In particular, the light signal generating device 38 is adapted to generate a light signal which illuminates the bottom end portion 16 of the sliding face 12 (see in particular FIG. 2). The light signal generated by the light signal generating device 38 in the region of the bottom end portion 16 of the sliding face 12 is limited to the bottom end portion 16 of the sliding face 12, that is to say the light signal illuminates the bottom end portion 16 of the sliding face 12, but not the escape route 18 or the ground adjacent to the escape route 18. Furthermore, the light signal has an irradiation direction which extends substantially perpendicular to a moving direction of an evacuee on the sliding face 12 of the evacuation slide 10, that is to say which extends across the sliding face 12 between the first lateral limitation element 20 and the second lateral limitation element 22 and substantially perpendicular to the dividing element 28.

The light signal generated by the light signal generating device 38 so as to illuminate the bottom end portion 16 of the sliding face 12 is already visible for an evacuee when stepping on the sliding face of 12 the evacuation slide 10 at the top end portion 14 thereof and thus provides a clear indication for the evacuee where the evacuee must change his or her posture to leave the sliding face 12 of the evacuation slide 10 and to continue his or her way along the escape route 18. In addition, the light signal increases the visible contrast between the sliding face 12 and the escape route 18 as well as the overall brightness in the region of the bottom end portion 16 of the sliding face 12. As a result, disturbance of the evacuee flow rate due to hesitation of evacuees in the region of the top end portion 14 of the sliding face 12 or pile-up of evacuees at the bottom end of the evacuation slide 10 at the transition to the escape route 18 can be avoided.

The light signal generating device 38 comprises a first lighting element 40 and a second lighting element 42. The first lighting element 40 is arranged in the first lateral edge portion of the evacuation slide 10 and is adapted to irradiate light in an irradiation direction directed towards a center portion of the sliding face 12, that is to say directed towards the dividing element 28. Specifically, the first lighting element 40 is fixed to the first lateral limitation element 20 at a wall portion thereof which faces the center portion of the sliding face 12, that is to say the dividing element 28. The second lighting element 42 is arranged in the second lateral edge portion of the evacuation slide 10 and hence opposite to the first lighting element 40. The second lighting element 42 is also adapted to irradiate light in an irradiation direction directed towards the center portion of the sliding face 12. Thus, the first lighting element 40 and the second lighting element 42 irradiate light in opposed irradiation directions so as to ensure proper illumination of the entire bottom end portion 16 of the sliding face 12. The second lighting element 42 is fixed to the second lateral limitation element 22 at a wall portion thereof which faces the center portion of the sliding face 12, that is to say the dividing element 28.

Each of the first and the second lighting element 40, 42 comprises a light emitting diode, in particular a white light emitting diode. The first and the second lighting element 40, 42 thus are of a compact design and can be operated in an energy saving manner. The first and the second lighting element 40, 42 are supplied with electric energy from an energy source of the light signal generating device 38 which may, for example, be designed in the form of a battery or an accumulator (not shown in the Figures). Furthermore, each of the first and the second lighting element 40, 42 comprises a focusing lens which is adapted to focus the light emitted by the lighting elements 40, 42 to the bottom end portion 16 of the sliding face 12 and thus ensures that only the bottom end portion 16 of the sliding face 12, but not the escape route 18 is illuminated by the first and the second lighting element 40, 42.

Operation of the first and the second lighting element 40, 42 is controlled by a control unit (not shown) of the light signal generating device 38. Usually, the control unit controls the first and the second lighting element 40, 42 so as to emit a continuous light signal. It is, however, also envisioned to design and control the first and the second lighting element 40, 42 so as to emit a light signal having a varying intensity and/or a varying color over time.

The light signal generating device 38 further comprises a plurality of third and fourth lighting elements 44, 46 which are fixed to the first and the second lateral limitation elements 20, 22 at wall portions thereof which face the center portion of the sliding face 12, that is to say the dividing element 28, along the sliding face 12. The third and fourth lighting elements 44, 46 serve to illuminate the sliding face 12. Fifth lighting elements 48 are attached to the dividing element 28. Sixth lighting elements 50 are attached to the bottom end of the evacuation slide 10 and serve to illuminate the escape route 18. Finally, seventh lighting elements 52 are provided in edge regions of the bottom end of the evacuation slide 10 which serve to provide guidance for the evacuees regarding the direction of the escape route 18. The operation of the third to seventh lighting elements 44, 46, 48, 50, 52, like the operation of the first and the second lighting element 40, 42, is controlled by the control unit of the light signal generating device 38. Furthermore, the third to seventh lighting elements 44, 36, 48, 50, 52, like the first and the second lighting element 40, 42, are supplied with energy from the energy source of the light signal generating device 38.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An evacuation slide comprising:
    a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated;
    a lateral limitation element extending parallel to the sliding face from the top end portion to the bottom end portion and extending from a lateral edge of the sliding face;
    a light signal generating device comprising:
        at least a first lighting element that is directly fixed to a wall portion of the lateral limitation element facing a center portion of the sliding face; and
        at least one escape route lighting element attached directly to the bottom end portion and illuminating the escape route,
    wherein the first lighting element emits a light projected on the bottom end portion of the sliding face, wherein the first lighting element comprises a focusing lens adapted to focus light emitted by the first lighting element such that the light projected illuminates the bottom end portion of the sliding face substantially without illuminating the escape route and whereby the light signal generating device is configured to produce a visible brightness contrast between the bottom end of the sliding face and the escape route.

2. The evacuation slide according to claim 1, wherein the light signal generating device is configured to generate light in an irradiation direction which extends substantially perpendicular to a moving direction of an evacuee on the sliding face of the evacuation slide.

3. The evacuation slide according to claim 1, wherein the light signal generating device further comprises at least a second lighting element.

4. The evacuation slide according to claim 3, wherein at least one of the first lighting element or the second lighting element comprises a light emitting diode.

5. The evacuation slide according to claim 3, wherein the second lighting element comprises a focusing lens adapted to focus light emitted by the second lighting element to the bottom end portion of the sliding face.

6. The evacuation slide according to claim 3, wherein the first lighting element is arranged in a first lateral edge portion of the evacuation slide and is adapted to emit light in an irradiation direction directed towards a center portion of the sliding face.

7. The evacuation slide according to claim 6, wherein the second lighting element is arranged in a second lateral edge portion of the evacuation slide opposite the first lateral edge portion and is adapted to emit light in an irradiation direction directed towards the center portion of the sliding face.

8. The evacuation slide according to claim 3, wherein the second lighting element is fixed to the lateral limitation element extending from the sliding face along the lateral edge of the sliding face.

9. The evacuation slide according to claim 8, wherein the second lighting element is fixed to a wall portion of the lateral limitation element which faces the center portion of the sliding face.

10. The evacuation slide according to claim 3, wherein the second lighting element is fixed to the sliding face in a region of a lateral edge of the sliding face.

11. A vehicle comprising an evacuation slide, the evacuation slide comprising:
    a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated;
    a lateral limitation element extending parallel to the sliding face from the top end portion to the bottom end portion and extending from a lateral edge of the sliding face;
    a light signal generating device comprising:
        at least a first lighting element that is directly fixed to a wall portion of the lateral limitation element facing a center portion of the sliding face; and
        at least one escape route lighting element attached directly to the bottom end portion and illuminating the escape route,
    wherein the first lighting element emits a light projected on the bottom end portion of the sliding face, wherein the first lighting element comprises a focusing lens adapted to focus light emitted by the first lighting element such that the light projected illuminates the bottom end portion of the sliding face substantially without illuminating the escape route and whereby the light signal generating device is configured to produce a visible brightness contrast between the bottom end of the sliding face and the escape route.

12. The vehicle according to claim 11, wherein the vehicle is an aircraft.

* * * * *